Oct. 30, 1962  J. T. McCUBBINS, JR  3,060,509
FORMING APPARATUS
Filed March 28, 1960  2 Sheets-Sheet 1
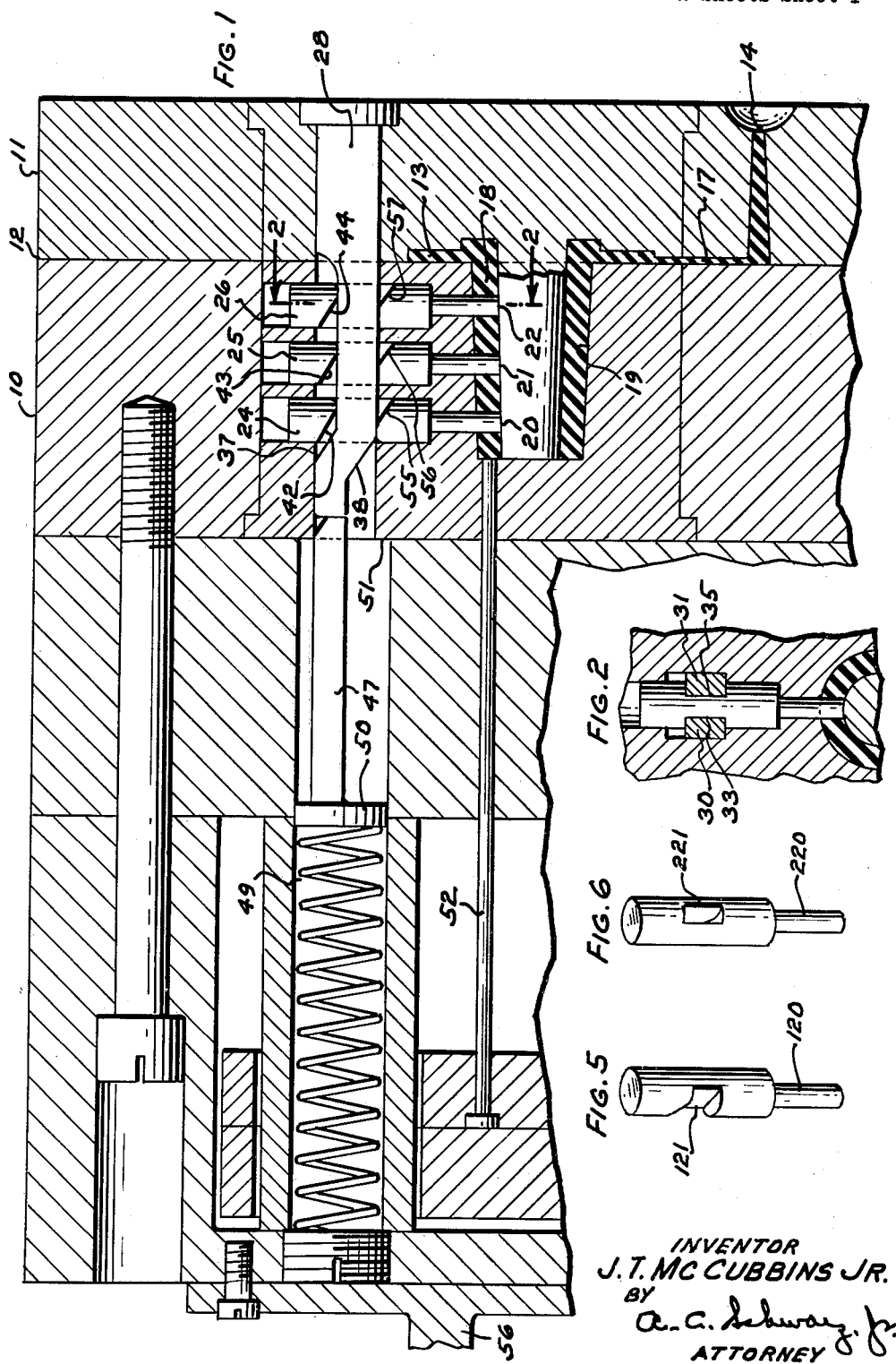
INVENTOR
J.T. McCUBBINS JR.
BY
A.C. Schwarz Jr.
ATTORNEY Oct. 30, 1962   J. T. McCUBBINS, JR   3,060,509
FORMING APPARATUS
Filed March 28, 1960   2 Sheets-Sheet 2
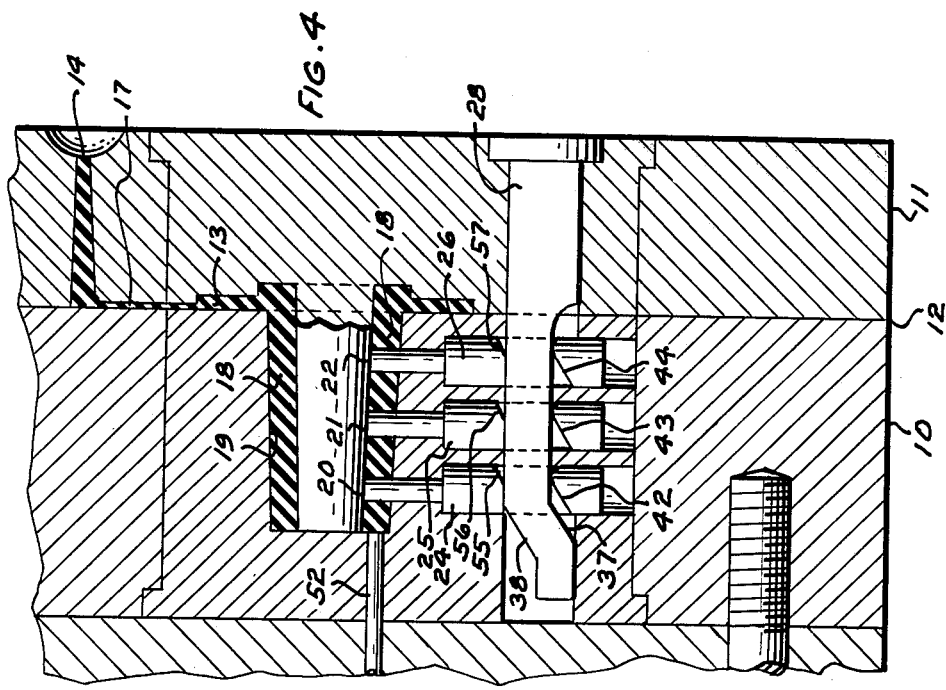
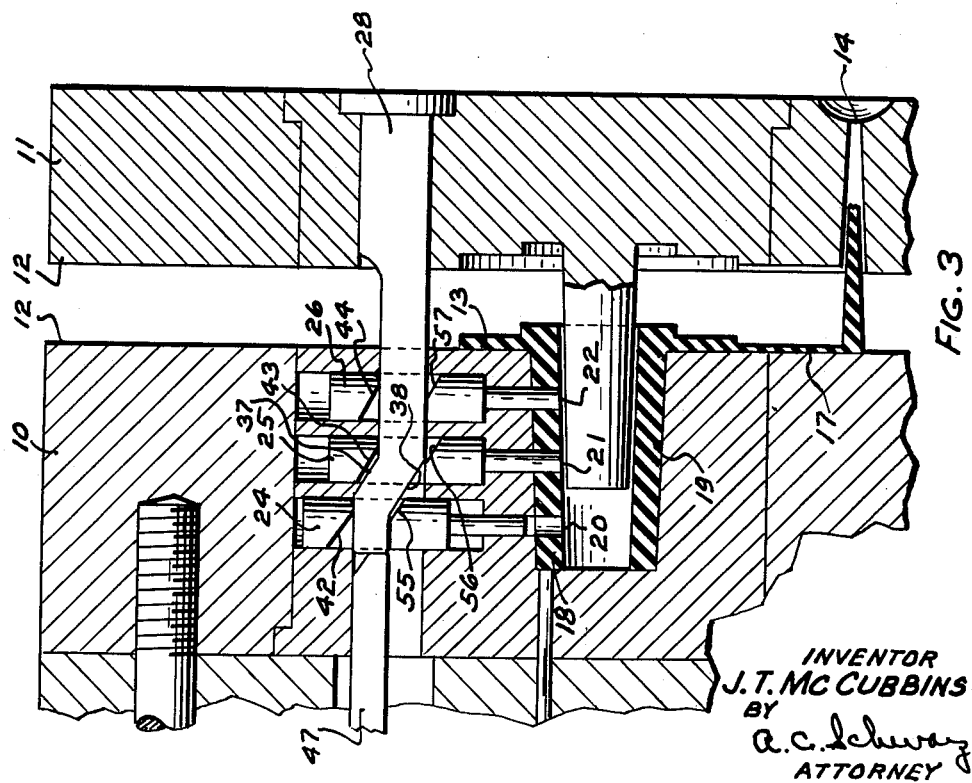
INVENTOR
J. T. McCUBBINS JR.
BY
A.C. Schwarz, Jr.
ATTORNEY

United States Patent Office

3,060,509
Patented Oct. 30, 1962

3,060,509
FORMING APPARATUS
James T. McCubbins, Jr., Lawrence, Ind., assignor to Western Electric Company, Incorporated, New York, N.Y., a corporation of New York
Filed Mar. 28, 1960, Ser. No. 18,087
4 Claims. (Cl. 18—42)

This invention relates to molding and casting apparatus, and more particularly to apparatus for moving projections, such as core pins, into and out of cavities in dies or molds such as in die casting, injection molding, transfer molding, compression molding, etc.

Such projections are commonly used in the molding and casting fields, and particularly during die casting or especially during injection molding to form recesses or apertures in the piece parts being molded or cast. These projections must be removed from the mold cavity when the mold sections are separated in order for the molded part to be removed. When the molded part contains only a single projection extending therein, the removal of the projection from the mold cavity containing the molded part presents no substantial problem. However, when a plurality of projections, such as pins, are simultaneously extracted from a mold cavity containing a cast or molded part, the part often splits or fractures during the removal and this tendency to split and fracture becomes more pronounced as the number of projections or pins extending into the molded part increases. The load on the extracting apparatus may also be so great that some portion of the extracting apparatus fractures.

It has been proposed in the past to use a rotating cam to circumvent this difficulty by withdrawing the pins or other projections successively. However, such apparatus has left much to be desired in that complicated mechanisms, to translate the rotary motion of the cam into the multiplicity of linear motions of the several pins or projections, have been required.

It is, therefore, an object of this invention to provide a simplified apparatus to facilitate the successive removal of projections such as pins from cavities containing molded or cast parts.

Another object of the present invention is to provide an apparatus for successively removing pins or other similar projections from a mold cavity containing a cast or molded part by a pin withdrawing means which is operable upon movement apart of the mold sections.

A further object of the invention is to provide a molding apparatus containing a camming means directly engaging projections extending into a mold cavity containing a molded part, such as camming means being adapted to successively remove the projections from the mold cavity and thus from the molded part.

Still another object of the instant invention is to provide a molding apparatus wherein there is a camming means which successively removes core pins from a mold cavity upon opening of the mold and successively introduces the pins into the mold cavity upon closing of the mold.

A still further object of the invention is to provide a molding apparatus wherein there is a first means for successively removing core pins from a mold cavity as the mold sections are separated, and a second means for positively holding the pins out of the mold cavity when the mold sections are still apart, i.e. while the tool is open.

With these and other objects in mind, the present invention contemplates a molding or casting apparatus having at least two mold sections adapted for relative movement to closed and open positions, a plurality of movable pins adapted to extend into a mold cavity in one of the mold sections when the mold is closed, and a sliding cam, which is operable upon movement of the mold sections apart, to directly engage the pins and successively cam them out of the mold cavity as the mold opens.

More particularly, in accordance with the present invention, the mold comprises a slide having a first and second camming surface, wherein the slide is attached to and movable with a mold section not containing the pins therein. The first camming surface of the slide directly engages a first portion of the pins and successively removes the pins from the mold cavity as the mold opens, whereas, the second camming surface of the slide directly engages a second portion of the pins and successively introduces the pins into the mold cavity as the mold closes. Also, when the mold is closed, the slide is provided to hold each pin a desired distance within the mold cavity.

In one embodiment of the invention, it is desirable for the mold to include a second slide, located within the mold section containing the pins, which follows the first slide upon opening of the mold and positively holds the pins out of the mold cavity when the mold is open so that the molded part within the mold may be readily removed. It is also advantageous for the first slide to be self-aligning as the mold sections are closed.

A complete understanding of the invention may be obtained, and other objects, advantages and novel features thereof will become apparent, by reference to the following detailed description of a preferred embodiment of the invention, when taken in conjunction with the accompanying drawings, in which FIG. 1 is a fragmentary vertical sectional view of the molding apparatus with the mold sections thereof in a closed position;

FIG. 2 is a fragmentary vertical sectional view taken along the plane of line 2—2 of FIG. 1 and looking in the direction of the indicating arrows;

FIG. 3 is a fragmentary vertical sectional view similar to that of FIG. 1 but with the mold sections of the molding apparatus partially separated;

FIG. 4 is a fragmentary vertical sectional view of a modified form of the molding apparatus, and FIGS. 5 and 6 are perspective views of modified mold cavity projecting pins, useful in accordance with the present invention.

Referring now to the drawings, wherein like reference numerals designate similar parts throughout the various views, there is shown (FIGS. 1, 3 and 4) a two-section molding apparatus wtih its mold sections closed (FIGS. 1 and 4) or partially separated (FIG. 3). The mold comprises a stationary mold section 11 and a movable mold section 10 which are separable along a parting line 12. The mold may be opened or closed manually or by means of a piston rod 56 (FIG. 1) suitably attached to the movable mold section 10 and reciprocable by an air cylinder or other equivalent means, not shown.

The stationary mold section 11 contains an injection sprue 14 into which a deformable material to be cast or molded is introduced. When the mold is closed, as shown in FIGS. 1 and 4, a deformable material may flow from the sprue 14 through a lateral passageway 17 and then into a mold cavity 19. The mold cavity 19 is adapted to form a generally frusto-conical hollow molded part 18 of plastic, metal, etc. having a circular, laterally extending flange 13 at the widest end thereof. The molded part 18 further advantageously contains three apertures formed by core pins or projections 20, 21 and 22, which extend laterally into the mold cavity 19. The particular material to be shaped by injection into the mold and the resulting configuration of the molded article formed may vary considerably and still fall within the purview of the present invention.

Engaging shanks 24, 25 and 26 of the core pins is a bifurcated slide or bar 28 containing furcations 30 and 31 (see FIG. 2). These furcations ride in grooves 33 and 35 in the sides of the shanks of the core pins. The bifurcated slide 28 further contains on each furcation, a first inclined camming surface 37 and a second inclined camming surface 38. The slide 28 is firmly attached to the stationary mold section 11. Therefore, when the mold opens (see FIG. 3), upon movement of the mold section 10 away from the mold section 11, the first inclined surface 37 of the slide 28 successively engages camming surfaces 42, 43 and 44 of the pins 20, 21 and 22, respectively. This successively withdraws the pins 20, 21 and 22 from the mold cavity 19 and thus from the molded part 18. By thus successively withdrawing the core pins, the pulling forces exerted on the molded part 18 are held to a minimum. If all of the core pins 20, 21 and 22 were simultaneously removed, it has been observed in practice that the molded part 18 often fractures.

In the preferred embodiment of the invention (FIGS. 1 to 3), as the mold opens and the mold section 10 moves to the left away from the mold section 11 and the attached slide 28 (FIG. 3), a second bifurcated slide 47, which engages the inner extremity of the slide 28, is moved to the right by a spring 49 (FIG. 1) and successively holds the pins 20, 21 and 22 in the withdrawn position by engagement with an extremity of the grooves 33 and 35. Although, when the mold is closed the slide 28 holds the second slide 47 away from engagement with the grooves 33 and 35 in the shanks 24, 25 and 26 of the core pins, when the mold is completely open, the second slide 47 moves to the right and engages the grooves in the shanks of all of the pins, thereby positively holding the pins in a position which is completely withdrawn from the mold cavity 19. Also, when the mold is completely open, a collar 50 (FIG. 1) formed on the slide 47 engages an abutment surface 51 of the mold section 10, thus limiting the movement to the right of the slide 47. The mold section 10 is also conventionally provided with at least one knockout pin 52 to eject the molded part 18 when the mold is open.

With reference to the embodiment of the invention shown in FIGS. 1 and 3, it is apparent that the second slide 47 is a necessary component of the apparatus shown. This is because, in opening the mold, as the inclined surface 37 of the slide 28 successively cams the pins 20, 21 and 22 upwardly and out of the mold cavity 19, after the slide 28 has passed each pin, the pin would fall down back into the mold cavity 19 were it not for the second slide 47 following the slide 28 and holding the pins in place and out of the mold cavity. Obviously, if a pin or pins fall back into the mold cavity 19, it will be impossible to remove the molded part 18 from the mold cavity 19 even though the mold is open.

On the other hand, in the embodiment of the invention shown in FIG. 4, the second slide 47 is not necessary since, once the slide 28 has cammed each pin out of the mold cavity 19, gravity holds each pin in that position. However, although the second slide 47 is not always indispensable, it is within the purview of the present invention to optionally employ such a second slide as a positive pin holding means which, in addition to gravity, maintains the core pins out of the mold cavity until the molded part is removed.

Referring now to FIGS. 5 and 6, there are shown two alternative embodiments of the invention with respect to the core pins which are moved from the mold cavity 19 by the camming slide 28. In FIG. 5 there is shown a core pin 120 containing a single groove 121 on one side thereof. In this instance, the camming slide, which is equivalent in function to the slide 28 of FIG. 1, need not be bifurcated, and thus in FIG. 4 only a single camming arm of such a slide is necessary.

Also in FIG. 6 there is shown a core pin 220 containing an aperture 221 located within the core pin and adapted to receive a single camming arm of a camming slide, likewise equivalent to the slide 28 of FIG. 1. In this instance also, the slide for camming the core pins out of the mold cavity is not bifurcated.

Referring again to FIGS. 1 and 3 of the drawings, after the mold sections have been separated and the molded part ejected, it is again necessary to close the mold thereby bringing the mold sections 10 and 11 into facial relationship. The mold manifestly must be thus closed before a deformable material to be shaped is injected therein. In closing the mold, as the mold section 10 is moved toward the mold section 11 carrying the slide 28, the slide 28 urges the second slide 47 to the left. The second camming surface 38 of the slide 28 then successively engages camming surfaces 57, 56 and 55 of the pins 22, 21 and 20, respectively. This action successively cams the pins into the mold cavity 19 as the slide 28 is forcing the second slide 47 to the left against the action of the spring 49. The mold is finally clamped in a closed position (by a conventional clamping means, not shown) and the mold is then again ready to receive a deformable material such as molten metal or plastic to be shaped as by molding or casting.

It is to be understood that the above-described arrangements are simply illustrative of the application of the principles of the invention. Numerous other arrangements, modifications and variations may be readily devised by those skilled in the art, which will embody the principles of the invention and thus fall within the spirit and scope thereof.

What is claimed is:

1. Molding apparatus comprising two mold sections defining a mold cavity therebetween and arranged for relative movement between open and closed positions, one of the mold sections having a plurality of core members mounted in substantial alignment for movement into and out of said mold cavity in directions transverse to the direction of relative opening and closing movement of said mold sections, said core members being arranged in a row in alignment with the direction of relative movement of said mold sections, a cam element forming a portion of each core member, each cam element being substantially aligned with every other cam element when said core members are in a core forming position in said mold cavity, and a slide bar secured to the other of said mold sections and movable transversely with respect to the cam elements, said bar having an inclined camming surface projecting away from the end of said bar and positioned to engage successively said cam elements of said core members for successively withdrawing each core member from said mold cavity upon relative movement of said mold sections to the open position.

2. Molding apparatus comprising two mold sections defining a mold cavity therebetween and arranged for relative movement between open and closed positions, one of the mold sections having a plurality of slotted core members mounted in substantial alignment for movement into and out of said mold cavity in directions transverse to the direction of relative opening and closing movement of said mold sections, one slot in each core member extending transversely through and being substantially aligned with every other slot in each core member when said core members are in a core forming position in said mold cavity, a camming member secured to the other of the mold sections movable in the slots in said core members, an inclined cam portion formed on said camming member for successively camming each core member so that each core member is successively withdrawn from said mold cavity upon movement of said mold sections towards the open position, and means biased to contact said camming member and engaging the slots subsequent to the camming of said core members from said mold cavity, said means maintaining said core members withdrawn from said mold cavities while the mold sections are in the open position.

3. The molding apparatus as claimed in claim 2, wherein said camming member and said means are bifurcated and wherein the core members are slotted on opposite sides thereof to receive said camming member and said means.

4. In a molding apparatus, a pair of molding sections mounted for relative movement toward and away from each other, a first of said sections having a molding cavity formed therein, a plurality of slidable core pins mounted to move into and out of said cavity in a direction transverse to said relative movement, said pins being arranged in a row in alignment with the direction of said relative movement, a pair of spaced cam surfaces on each of said pins, a slide bar attached to a second of said sections and projecting through and between said core pin cam surfaces, said bar having a first cam surface for successively engaging a first of each of said core pin cam surfaces during movement of said molding sections away from each other to withdraw successively said core pins from said cavity, said bar having a second cam surface for successively engaging a second of each of said core pin cam surfaces during movement of said molding section toward each other to successively advance said core into said cavity, and means for imparting relative movement to said molding sections.

References Cited in the file of this patent

UNITED STATES PATENTS

| | | |
|---|---|---|
| 1,469,820 | Ruby | Oct. 9, 1923 |
| 2,477,368 | Gits | July 26, 1949 |
| 2,783,502 | Abplanalp | Mar. 5, 1951 |